United States Patent [19]

Miyauchi et al.

[11] Patent Number: 5,328,216
[45] Date of Patent: Jul. 12, 1994

[54] THIN PIPE CONNECTING JOINT

[75] Inventors: Yuji Miyauchi, Tagata; Katsushi Umezawa, Numazu, both of Japan

[73] Assignee: Usui Kokusai Sangyo Kaisha Ltd., Japan

[21] Appl. No.: 28,993

[22] Filed: Mar. 10, 1993

[30] Foreign Application Priority Data

Mar. 11, 1992 [JP] Japan .................................. 4-087646

[51] Int. Cl.$^5$ ............................................. F16L 37/12
[52] U.S. Cl. ................................... 285/319; 285/369; 285/906; 285/921
[58] Field of Search ................. 285/319, 921, 369, 906

[56] References Cited

U.S. PATENT DOCUMENTS

| | | |
|---|---|---|
| 2,892,991 | 6/1959 | Beebee et al. . |
| 3,169,030 | 2/1965 | Lippincott . |
| 3,453,005 | 7/1969 | Foulto . |
| 3,826,523 | 7/1974 | Eschbaugh . |
| 3,933,378 | 1/1976 | Sanford et al. . |
| 4,026,581 | 5/1977 | Pasbrig . |
| 4,035,005 | 7/1977 | De Vincent et al. . |
| 4,074,912 | 2/1978 | Van Bilderbeek et al. . |
| 4,219,222 | 8/1980 | Brusadin . |
| 4,275,907 | 6/1981 | Hunt . |
| 4,451,069 | 5/1984 | Melone . |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunnigham . |
| 4,793,637 | 12/1988 | Laipply et al. . |
| 4,895,396 | 1/1990 | Washizu . |
| 4,913,467 | 4/1990 | Washizu . |
| 4,915,420 | 4/1990 | Washizu . |
| 4,944,537 | 7/1990 | Usui et al. . |
| 4,946,205 | 8/1990 | Washizu . |
| 4,948,180 | 8/1990 | Usui et al. . |
| 4,964,658 | 10/1990 | Usui et al. . |
| 4,997,216 | 3/1991 | Washizu . |
| 5,048,875 | 9/1991 | Usui et al. . |
| 5,087,084 | 2/1992 | Gehring . |
| 5,090,747 | 2/1992 | Kotake . |
| 5,090,748 | 2/1992 | Usui et al. . |
| 5,094,481 | 3/1992 | Takikawa et al. . |
| 5,098,136 | 3/1992 | Washizu . |
| 5,112,084 | 5/1992 | Washizu . |
| 5,114,250 | 5/1992 | Usui . |
| 5,131,691 | 7/1992 | Washizu . |
| 5,141,264 | 8/1992 | Usui . |
| 5,154,451 | 10/1992 | Washizu . |
| 5,160,177 | 11/1992 | Washizu . |
| 5,163,719 | 11/1992 | Washizu . |
| 5,172,940 | 12/1992 | Usui et al. . |
| 5,176,412 | 1/1993 | Washizu . |

FOREIGN PATENT DOCUMENTS 593413 5/1959 Italy .
855603 12/1960 United Kingdom .

Primary Examiner—Dave W. Arola
Attorney, Agent, or Firm—Anthony J. Casella; Gerald E. Hespos

[57] ABSTRACT

A thin pipe connecting joint comprises: a joint body including retaining walls bent individually from the two end portions thereof, and an assembly hole extending through the axis thereof; and a pair of pipes including engagement walls formed at their end portions to be connected and adapted to be brought into abutment against each other, elastic seal ring members assembled on the individual back faces of the engagement walls, and a socket member inserted on the back of one of the elastic seal ring members and having a plurality of protruded tongue walls opened backward. When the engagement walls of the pipes are assembled in the assembly hole of the joint body, the other of the seal ring members is retained on the retaining wall at the same side, and the one of the seal ring members is pushed and held by the socket member so that the pipes are connected by retaining the tongue walls of the socket member on the retaining wall at one side of the joint body.

9 Claims, 6 Drawing Sheets

PRIOR ART

THIN PIPE CONNECTING JOINT

BACKGROUND OF THE INVENTION

1. Field of the Invention

The present invention relates to a pipe connecting joint and, more particularly, to a thin pipe connecting joint for connecting metal pipes or resin tubes (as will be shortly referred to as "pipes"), which are arranged for oil or air supply piping in automobiles or various machines or apparatus and which have a relatively small diameter of 20 mm or less.

2. Description of the Prior Art

The connecting joint of this type has already been proposed in the prior art by our Japanese Patent Laid-Open No. 268190/1990. In the axial hole of a joint body 1, as shown in FIG. 13, there are fitted seal ring members 25 and bushing members 26 which are pushed into contact with the outer circumference of a first pipe $P_1$ to be assembled into one end portion of a communication hole 24. At the same time, a socket member 22 having a pawl wall 22' to engage with an annular bulging wall $P_1'$ formed in the vicinity of the end portion of the pipe to be connected is retained on the circumference of the same side of a joint body 1. A second pipe $P_2$ having an annular flanged wall $P_2'$ is assembled into other end portion. In this state, the end portion is caulked inward to hold the other seal ring member 25 and bushing member 26. and the second pipe $P_2$ is held to move a predetermined distance in the axial direction through an internal space 23.

As a result, the joint body 21 can be easily moved the predetermined distance in the axial direction together with the second pipe $P_2$ without any change in the relative positions of the two pipes so that the pipes can be easily connected in a narrow space. Moreover, the pipes can be connected while adjusting its arrangement length to reduce the troubles in the connecting operations. Still moreover, the components at the connected portions including the plated pipes can be used to improve the working efficiency because they need not be treated after the connecting operations. At the same time, the portions in the vicinity of the connected portions are satisfactorily freed from any degradation in the mechanical strength due to the cracking or breakage. In such prior art, however, the axial space 23 has to be held in the joint body 21 so as to ensure the aforementioned movement of the predetermined distance. This necessity generally elongates the joint body and increases the weight of the same. In these respects, the thin pipe connecting joint has been desired to improve.

SUMMARY OF THE INVENTION

The present invention has been conceived in view of the above-specified problems of the prior art and has an object to provide a highly reliable thin pipe connecting joint which is enabled to enhance the degree of arranging freedom by making the joint body relatively short, to facilitate the connection in a narrow space by making the structure light and compact, and to effect remarkably safe and reliable connections for a long time period by eliminating any fatigue or leakage in the connected portions under the vibrated state.

In order to achieve the above-specified object, according to a first aspect of the present invention, there is provided a thin pipe connecting joint comprising: a joint body including retaining walls bent individually from the two end portions thereof, and an assembly hole extending through the axis thereof; and a pair of pipes including engagement walls formed at their end portions to be connected and adapted to be brought into abutment against each other, elastic seal ring members assembled on the individual back faces of the engagement walls, and a socket member inserted on the back of one of the elastic seal ring members and having a plurality of protruded tongue walls opened backward. When the engagement walls of the pipes are assembled in the assembly hole of the joint body, the other of the seal ring members is retained on the retaining wall at the same side, and the one of the seal ring members is pushed and held by the socket member so that the pipes are connected by retaining the tongue walls of the socket member on the retaining wall at one side of the joint body. Vibration absorbing or protecting rings are mounted between the back faces of the engagement walls and the elastic seal ring members.

According to a second feature of the present invention, there is provided a thin pipe connecting joint comprising: a joint body including a retaining wall acting as holding means at the other end thereof, and an assembly hole extending through the axis thereof; and a pair of pipes including engagement walls formed at their end portions to be connected and adapted to be brought into abutment against each other, elastic seal ring members assembled on the individual back faces of the engagement walls, and a cylindrical or bag-shaped socket member inserted on the back of one of the elastic seal ring members. When the engagement walls of the pipes are assembled in the assembly hole of the joint body, the other of the seal ring members is retained on the holding means at the same side, and the one of the seal ring members is pushed and held by the socket member so that the pipes are connected by retaining them on the joint body by the snap ring at the overlapped circumference. Vibration absorbing or protecting rings are mounted between the back faces of the engagement walls and the elastic seal ring members. Moreover, the holding means includes a bent portion or caulked portion of the retaining wall at the other end portion of the joint body.

According to a third feature of the present invention, there is provided a thin pipe connecting joint comprising: a joint body including at least one retaining wall bent from the other end portion thereof, and an assembly hole extending through the axis thereof; and a pair of pipes including engagement walls formed at their end portions to be connected and adapted to abut against or to be fitted in each other, elastic seal ring members assembled on the individual back faces of the engagement walls, and a socket member inserted on the back of one of the elastic seal ring members and having a plurality of protruded tongue walls opened backward. When the engagement walls of the pipes are assembled in the assembly hole of the joint body, the other of the seal ring members is retained on the retaining wall at the same side, and the one of the seal ring members is pushed and held by the socket member so that the pipes are connected by retaining the tongue walls on the retaining means at one side of the joint body. Vibration absorbing or protecting rings are mounted between the back faces of the engagement walls and the elastic seal ring members. Moreover, the retaining means at the one side of the joint body includes an aperture or a bent retaining wall.

According to a fourth feature of the present invention, there is provided a thin pipe connecting joint comprising: a joint body including at least one retaining wall bent from the one end portion thereof, and an assembly hole extending through the axis thereof; and a pair of pipes including engagement walls formed at their end portions to be connected and adapted to be brought into abutment against each other, elastic seal ring members assembled on the individual back faces of the engagement walls, and a spring mounted on the back of at lest one of the elastic seal ring members. When the engagement walls of the pipes are assembled in the assembly hole of the joint body, the other side is retained on the retaining wall at the same side, and the socket member inserted through the one spring is retained on the joint body by retaining means so that the pipes are connected by pushing the elastic seal ring members onto the engagement walls. Vibration absorbing or protecting rings mounted between the back faces of the engagement walls and the elastic seal ring members. At the same time, the socket member has either protruded tongue walls opened backward or a bag shape. Moreover, the retaining means includes a retaining wall at one end portions of the joint body or a snap ring on the overlapped circumference.

According to a fifth embodiment of the present invention, there is provided a thin pipe connecting joint comprising: a joint body including a retaining wall bent from the other end portion thereof, and an assembly hole extending through the axis thereof; and a pair of pipes including engagement walls formed at their end portions to be connected and adapted to be brought into abutment against each other, elastic seal ring members assembled through vibration absorbing rings or protecting rings on the individual back faces of the engagement walls, and a socket member inserted on the back of one of the elastic seal ring members and having a pawl wall protruded from the outer circumference. When the engagement walls of the pipes are assembled in the assembly hole of the joint body, the other of the seal ring members is retained on the retaining wall at the same side, and the one of the seal ring members is pushed and held by the socket member so that the pipes are connected by the retentions between the leading end engagement portions of an elastic arm of a cylindrical collar fixed to cover the joint body and the pawl wall of the socket member. Moreover, the vibration absorbing or protecting rings are mounted to cover the engagement walls.

According to the present invention, one of the pipes is assembled in advance into the joint body through the elastic seal ring member, and the other pipe is then assembled into the joint body to retain the socket member in the joint body. As a result, the individual pipes have their engagement walls abutting against or fitted in each other so that the joint body can be made relatively short, light and compact. Thus, the connections in a narrow space can be accomplished more easily and without any trouble by enhancing the degree of arranging freedom. At the same time, the connected portions can be freed from any fatigue and leakage even under a vibrated state. As a result, the connections can be made safe and reliable for a long time period to enhance the reliability.

DESCRIPTION OF THE PREFERRED EMBODIMENTS

Figure 1:
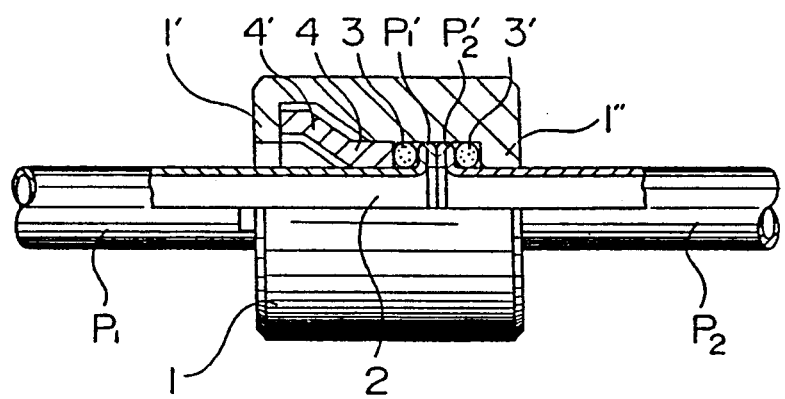
FIG. 1 is a partially cut-away section showing a thin pipe connecting joint of the present invention which is in a connected state.

The present invention will be described in the following in connection with its embodiments with reference to the accompanying drawings. In FIGS. 1 to 12, a joint body 1 is constructed to include: an assembly hole 2 extending through its axis; and retaining walls bent from the two end portions thereof. Reference numerals 3 and 3' designate elastic seal ring members made of a rubbery material or a synthetic resin. These seal ring members 3 and 3' are assembled through vibration absorbing or protecting rings 5, if necessary, into the individual back faces of bulging engagement walls $P_1'$ and $P_2'$ which are so formed at the connecting end portions of a pair of pipes $P_1$ and $P_2$ as to be brought into abutment against each other. Into the back of one of engagement walls $P_1'$ and $P_2'$, there are inserted a socket member 4 which is opened backward to have a plurality of protruding tongue walls 4' so that the engagement walls $P_1'$ and $P_2'$ of the pipes $P_1$ and $P_2$ are assembled into the assembly hole 2 of the joint body 1. In this state, the other seal ring member 3' is retained on the retaining wall 1' at the same side, and the one seal ring member 3 is pushed and held by the socket member 4, as shown in FIG. 2, so that the tongue walls 4' are retained on the retaining wall 1' at one end of the joint body 1.

Figure 2:
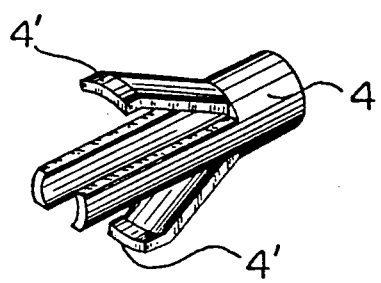
FIG. 2 is a perspective view showing the structure of a socket member used in the thin pipe connecting joint shown in FIG. 1.
Figure 3:
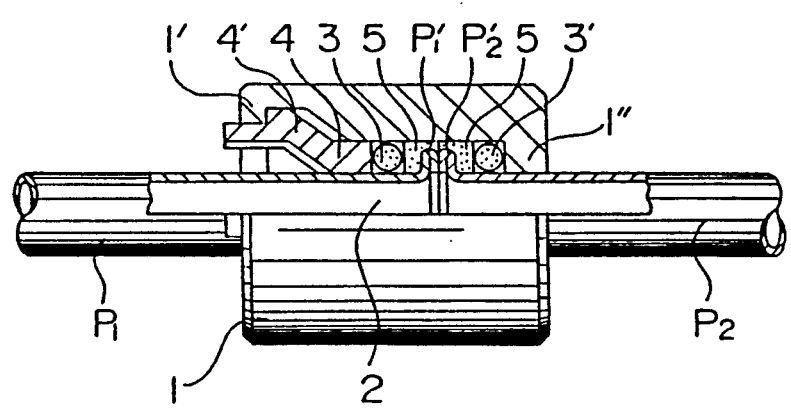
FIG. 3 is similar to FIG. 1 but shows another embodiment of the present invention.
Figure 4:
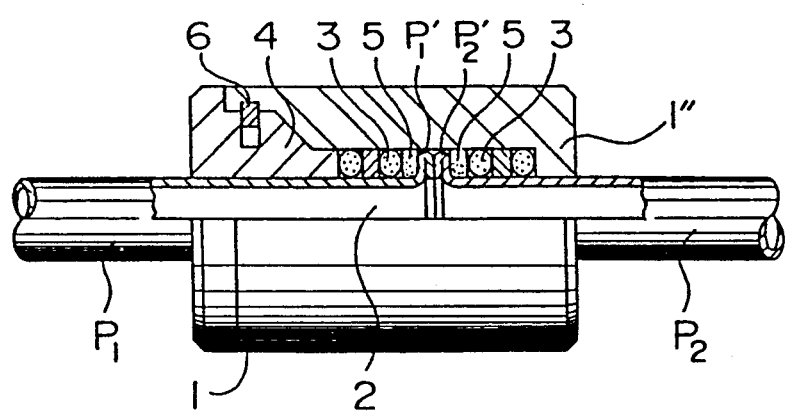
FIG. 4 is similar to FIG. 1 but shows still another embodiment of the present invention.
Figure 5:
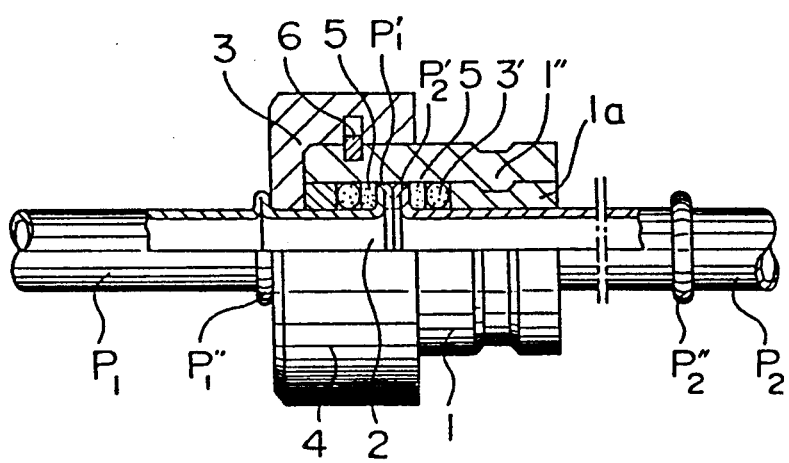
FIG. 5 is similar to FIG. 1 but shows a further embodiment of the present invention.
Figure 7:
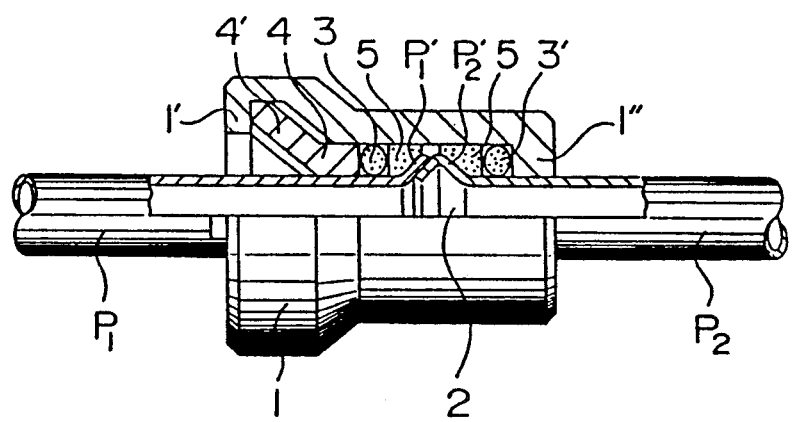
FIG. 7 is similar to FIG. 1 but shows a further embodiment of the present invention.
Figure 8:
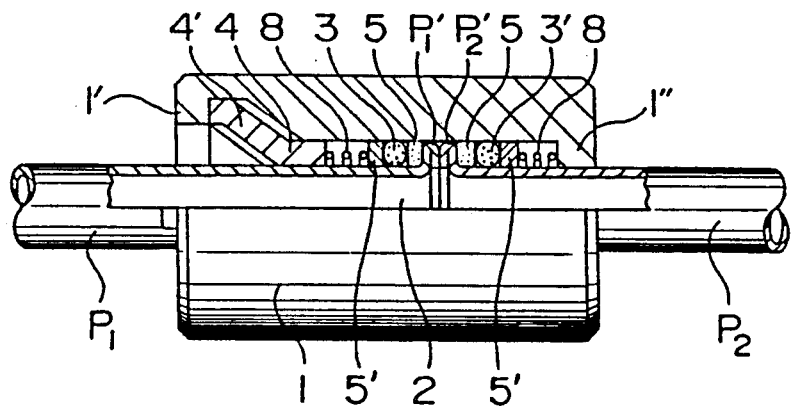
FIG. 8 is similar to FIG. 1 but shows a further embodiment of the present invention.
Figure 9:
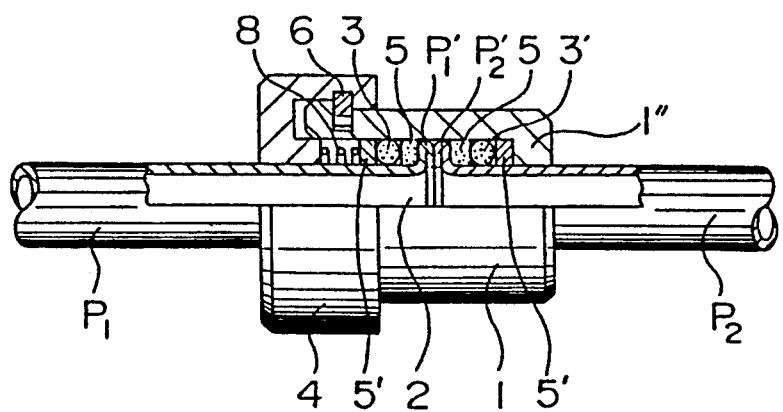
FIG. 9 is similar to FIG. 1 but shows a further embodiment of the present invention.
Figure 10:
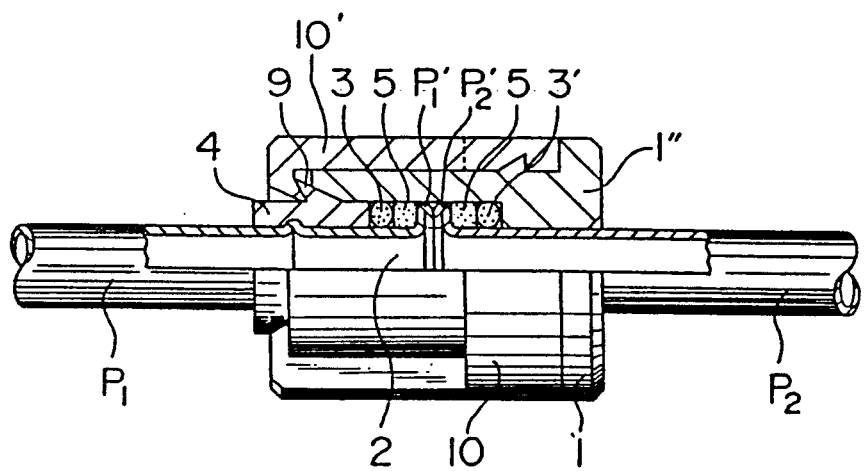
FIG. 10 is similar to FIG. 1 but shows a further embodiment of the present invention.

Incidentally, the embodiments, in which the joint body 1 has its two end portions bent to form the retaining walls 1 and 1', are shown in not only FIG. 1 but also FIG. 3 and FIGS. 6 to 8, according to the present invention, however, the bent retaining wall 1' can be formed at only one end portion, as shown in FIGS. 4, 9 and 10. As shown in FIG. 5, moreover, the joint body 1 can have its one end portion caulked from the outside to fix a sleeve 1a thereby to form the retaining wall 1'.

Figure 6:
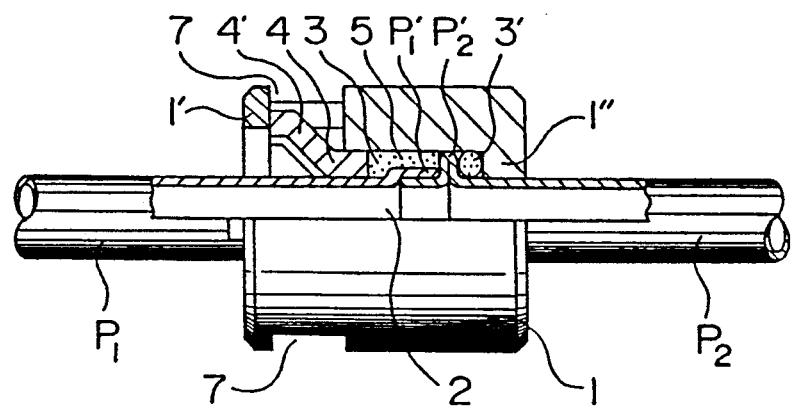
FIG. 6 is similar to FIG. 1 but shows a further embodiment of the present invention.

In addition, the engagement walls $P_1'$ and $P_2'$ can be formed not only by the bulging treatments, as shown in FIG. 1, FIGS. 3 to 5 and FIGS. 8 to 10, but also by a fitting treatment, as shown in FIG. 6, or by a bridge forming treatment, as shown in FIG. 7.

Figure 11:
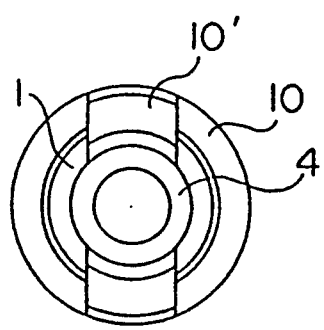
FIG. 11 is a front elevation showing the state in which the pipes of FIG. 10 are omitted.

On the other hand, the socket member 4 may be formed into a cylindrical shape and retained on the overlapped circumference of one side of the joint body 1 by a snap ring 6, as shown in FIG. 4. Alternatively, a pawl wall 9 protruded from the outer circumference of the cylindrical socket 4 may be retained on one end of a cylindrical collar 10 which is fixed by the fitting relation between the protrusion and the recess while covering the joint body 1 and which is formed with elastic arms 10' having engagement portions at their leading ends, as shown in FIGS. 10 and 11. Incidentally, the structure of FIG. 1 is exemplified by an embodiment in which the joint body 1 and the cylindrical collar 10 are not integral. However, similar effects could be attained if the two members were integrated. Moreover, the socket member 4 may be formed into a bag shape, as shown in FIG. 5. In this modification, a spring 8 may be mounted between the socket member 4 and the seal ring member 3 through a spacer 5', as shown in FIG. 9. Then, the spring 8 may be mounted through the spacer 5' between the seal ring member 3 and the socket member 4 having the tongue walls 4', as shown in FIG. 8. Numeral 7 appearing in FIG. 6 designates an aperture which is formed at one end side of the joint body 1 to form the retaining wall 1' for the tongue walls 4' of the socket member 4. Bulging walls $P_1''$ and $P_2''$ are formed on the pipes $P_1$ and $P_2$ to restrict the movements of the joint body 1 and the socket member 4 on the pipes $P_1$ and $P_2$ before these pipes are connected. Still moreover, the structure using the snap ring 6 may be modified, if necessary, to split the joint body 1 or the socket member 4.

Figure 12:
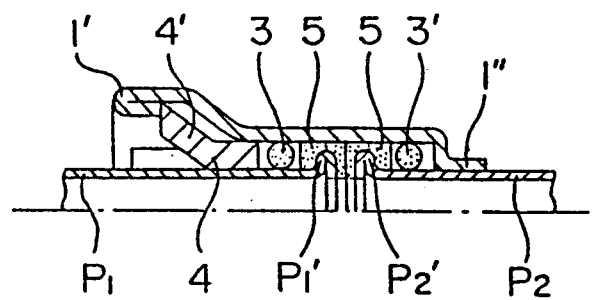
FIG. 12 is a section showing one half of a further embodiment of the present invention.
Figure 13:
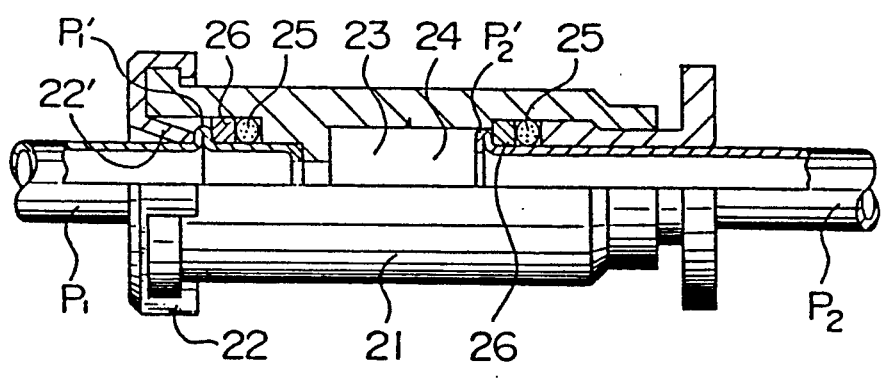
FIG. 13 is a partially cut-away section showing the thin pipe connecting joint of the prior art which is in a connected state.

If the vibration absorbing ring or protecting ring 5 is mounted to cover the engagement walls $P_1'$ and $P_2'$, as shown in FIG. 12, it can absorb the dispersion in the shape of the engagement walls and can prevent the fretting at the engagement walls when vibrations or twisting motions are applied to the pipes.

In the thin pipe connecting joint according to the present invention, as has been described hereinbefore, the paired pipes $P_1$ and $P_2$ are connected to have their engagement walls $P_1'$ and $P_2'$ are abutting against or fitted on each other to reduce the thrusting into the assembly hole 2 of The pipes $P_1$ and $P_2$. As a result, the joint body 1 can be made so relatively short, light and compact as to effect the connection more easily in a narrow space. At the same time, The degree of piping freedom can be enhanced to facilitate the connection. Under a vibratory state, moreover, the connected portions can be freed from any fatigue or leakage to have safe, reliable and credible connections for a long time. Thus, the present invention can provide a remarkably useful thin pipe connecting joint.

What is claimed is:

1. A thin pipe connecting joint for connecting first and second pipes, said pipes including engagement walls formed at respective ends thereof, said engagement walls being configured for abutting engagement with each other, first and second elastic seal ring members assembled around said first and second pipes respectively and adjacent the respective engagement walls thereof, said joint comprising:

a generally tubular socket member mounted over said first pipe such that said first seal ring member is intermediate said socket member and said engagement wall of said first pipe and said socket member having a cross-sectional dimension less than the cross-sectional dimension of said engagement wall on said first pipe and of said first seal, said socket member including a plurality of tongue walls protruding radially outwardly from said first pipe and away from the engagement wall thereof; and a joint body having opposed first and second ends and an assembly hole defining an interior surface extending therebetween, said second end of said joint body including an inwardly extending retaining wall having a cross-sectional dimension less than the cross-sectional dimension of said engagement wall on said second pipe and of said second seal and engaged around portions of said second pipe such that the second seal ring member is intermediate the engagement wall of the second pipe and the retaining wall at the second end of the joint body and sealingly engages said second pipe and said interior surface, the first end of said joint body surrounding said first pipe and said first seal ring such that said first seal ring sealingly engages said first pipe and said interior surface and said first end being configured to engage the tongue walls of the socket body such that the engagement walls of the pipes are held in abutting engagement with one another between the socket member and the retaining wall at the second end of said joint body.

2. A thin pipe connecting joint as in claim 1, wherein the first end of said joint body includes at least one inwardly extending retaining wall, said tongue walls of said socket member engaging said retaining wall at said first end of said joint body.

3. A thin pipe connecting joint as in claim 1, wherein the first end of said joint body defines a cross-sectional dimension greater than cross-sectional dimensions defined by the engagement wall of the first pipe such that said first pipe and said first seal can be inserted into said joint body from the first end thereof.

4. A thin pipe connecting joint as in claim 1, further comprising first and second vibration absorbing rings intermediate the engagement walls of the respective first and second pipes and the seal ring members thereof.

5. A thin pipe connecting joint as in claim 1, wherein the joint body comprises a plurality of apertures extending therethrough at locations intermediate the first and second ends thereof, said apertures being dimensioned and disposed for engaging the tongue walls of the socket member.

6. A thin pipe connecting joint as in claim 1, further comprising at least one coil spring surrounding at least one of said first and second pipes and disposed such that the seal ring member of the associated pipe is intermediate said coil spring and the engagement wall of the respective said pipe.

7. A thin pipe connecting joint as in claim 6, wherein the spring surrounds the first pipe and is compressed intermediate said socket member and said first seal ring member.

8. A thin pipe connecting joint as in claim 6, wherein said spring member surrounds said second pipe and is compressed intermediate the retaining wall at the second end of the joint body and the second seal ring member.

9. A thin pipe connecting joint as in claim 1, wherein the first end of the joint body comprises a generally tubular outer wall and an inner wall bent inwardly at the first end of the joint body and disposed substantially in face-to-face engagement with the outer wall, the tongue walls of the socket member being dimensioned to engage the inner wall of the joint body.

* * * * *